(12) United States Patent
Undy et al.

(10) Patent No.: US 6,647,487 B1
(45) Date of Patent: Nov. 11, 2003

(54) APPARATUS AND METHOD FOR SHIFT REGISTER RATE CONTROL OF MICROPROCESSOR INSTRUCTION PREFETCHES

(75) Inventors: Stephen R. Undy, Ft Collins, CO (US); James E McCormick, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/506,972

(22) Filed: Feb. 18, 2000

(51) Int. Cl.[7] .............................. G06F 9/30; G06F 9/315
(52) U.S. Cl. .................. 712/207; 712/237; 710/57
(58) Field of Search .............................. 712/205, 206, 712/207, 237, 238; 710/55, 57

(56) References Cited

U.S. PATENT DOCUMENTS

| | | | |
|---|---|---|---|
| 5,473,756 A | * 12/1995 | Traylor | 710/57 |
| 5,613,104 A | * 3/1997 | Hiraishi | 713/502 |
| 5,809,566 A | * 9/1998 | Charney et al. | 711/213 |
| 5,819,079 A | * 10/1998 | Glew et al. | 712/237 |
| 5,987,539 A | * 11/1999 | Goodrum | 710/55 |
| 6,035,393 A | * 3/2000 | Glew et al. | 712/237 |

OTHER PUBLICATIONS

Vellanki, Vivekanand; Chervenak, Ann L. ; A Cost Benefit Scheme for High Performance Predictive Prefetching. Proceedings of the 1999 ACM/IEEE conference on Supercomputing (CDROM). Jan. 1999.*

Tullsen , Dean M.; Eggers, Susan J.; ACM SIGARCH Computer Architecture News. Proceedings of the 20th annual international symposium on Computer architecture. May 1993 vol. 21 Issue 2.*

IBM Technical Disclosure Bulletin, "Bidirectional Queue Register for Cache Line Reads and Writes between Asynchronous Timing Boundaries", Oct. 1, 1996, vol. 39, Issue 10, pp. 153–154.*

* cited by examiner

*Primary Examiner*—David Wiley
*Assistant Examiner*—Scott M. Collins

(57) ABSTRACT

An apparatus and methods for optimizing prefetch performance. Logical ones are shifted into the bits of a shift register from the left for each instruction address prefetched. As instruction addresses are fetched by the processor, logical zeros are shifted into the bit positions of the shift register from the right. Once initiated, prefetching continues until a logical one is stored in the nth-bit of the shift register. Detection of this logical one in the n-th bit causes prefetching to cease until a prefetched instruction address is removed from the prefetched instruction address register and a logical zero is shifted back into the n-th bit of the shift register. Thus, autonomous prefetch agents are prevented from prefetching too far ahead of the current instruction pointer resulting in wasted memory bandwidth and the replacement of useful instruction in the instruction cache.

11 Claims, 3 Drawing Sheets

APPARATUS AND METHOD FOR SHIFT REGISTER RATE CONTROL OF MICROPROCESSOR INSTRUCTION PREFETCHES

FIELD OF THE INVENTION

The present invention relates to microprocessors and more particularly to methods and apparatus for optimizing prefetch performance.

BACKGROUND OF THE INVENTION

Modem microprocessors typically implement instruction prefetching. Prefetching is a mechanism whereby the processor hardware attempts to load or prefetch instructions into an instruction cache from higher levels of caches or from memory. If the load into the instruction cache occurs prior to the time the processor fetches the instruction, cache misses and associated performance penalties will not occur. Each one of these prefetch operations will attempt to load a number of instructions into the instruction cache. The number of instructions so loaded is typically equal to the number of instructions in a cache line. A cache line is defined to be the fundamental quantity of data that may be read or written into a cache.

Instruction prefetches may be initiated programmatically via prefetch instructions, by the hardware, or by a combination of the two. The prefetches may attempt to load just a few instructions, or they may attempt to load a long sequence of instructions. A problem can occur when prefetching a long sequence of instructions. In particular, instructions may be prefetched that will never be executed due to a change in control flow or branch. This situation can degrade performance for two reasons. First, every prefetch requires the use of processor and system resources, e.g., higher levels of caches, system busses, and memory units. If these resources are used by a prefetch they are unavailable for other uses, e.g., load or store operations. Second, when instructions are prefetched into the instruction cache, room must be made for them by overwriting existing instructions. These existing instructions may form part of the working set, i.e., they might be needed by the processor in the near future. Thus, overagressive prefetching, which occurs when too many instructions have been prefetched into the instruction cache but not yet fetched by the processor, can cause resources to be wasted and useful instructions in the instruction cache to be replaced by ones that may never be used.

Thus, there exists a need for limiting the number of instructions prefetched ahead of where the processor is fetching instructions from the current instruction pointer. It would be desirable and of considerable advantage to provide a mechanism by which the processor may prefetch a certain distance ahead of the instruction pointer. Such prefetching helps to hide the latency of the fetching process and prevents cache misses on instruction fetches without getting too far ahead as that could lead to wasted resources such as memory bandwidth and the replacement of useful instructions in the instruction cache.

SUMMARY OF THE INVENTION

In representative embodiments, the present invention provides method and apparatus for controlling the rate of instruction address prefetches by a microprocessor. Previous methods for prefetching have not concentrated on limiting the number of instructions prefetched ahead of where the processor is fetching instructions from the current instruction pointer leading to possible wasted memory bandwidth and the possible replacement of useful instructions in the instruction cache.

In a representative embodiment, the bits in a shift register are used to count the number of instruction addresses that have been prefetched. When an instruction prefetch address is issued to the processor, the prefetched address is added to a register and a logical one is shifted into the shift register from the left. Each prefetch issue to the processor will cause a cache line of instructions to be written into the instruction cache. When the last prefetched instruction on a cache line is fetched, a logical zero is shifted into the shift register from the right. When a logical one has been shifted into a preselected bit in the shift register, prefetching is temporarily suspended until the last instruction on a cache line is fetched by the processor, and a logical zero is shifted back into the preselected bit in the shift register. In summary, logical ones are shifted into the register from the left on prefetches and logical zeros are shifted into the register from the right when the instruction pointer crosses onto a new cache line. This mechanism will assure that, at most, "n" cache lines have been prefetched but not yet fetched by the processor. In other words, prefetches may be kept "n" cache lines in front of the instruction pointer by examining the n-th bit from the left.

A primary advantage of the embodiments as described in the present patent document over prior microprocessor prefetching techniques is that overagressive prefetching is eliminated. Prefetching into the instruction cache too many instructions beyond that which have been fetched by the processor can cause resources, such as memory bandwidth, to be wasted and useful instructions in the instruction cache to be replaced by ones that may never be used. The number of prefetches in front of the current instruction pointer is tightly controlled. Embodiments of the present invention thereby conserve valuable system resources.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1A:
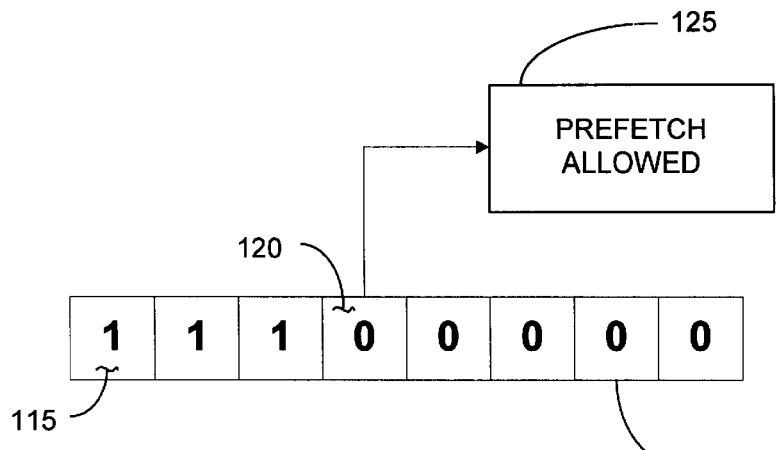
FIG. 1A is a drawing of a prefetch enable shift register as described in various representative embodiments of the present patent document.

As shown in the drawings for purposes of illustration, the present patent document relates to a novel method for controlling the rate of instruction address prefetches by a microprocessor. Previous methods for prefetching have not concentrated on limiting the number of instructions prefetched ahead of where the processor is fetching instructions from the current instruction pointer leading to possible wasted memory bandwidth and the possible replacement of useful instructions in the instruction cache. In the following detailed description and in the several figures of the drawings, like elements are identified with like reference numerals.

In a representative embodiment, the bits in a shift register are used to count the number of instruction addresses that have been prefetched but not yet fetched by the processor. When an instruction prefetch address is issued to the processor, a logical one is shifted into the shift register from the left. Each prefetch issued to the processor will cause a cache line of instructions to be written into the instruction cache. When the last instruction on a cache line is fetched, a logical zero is shifted into the shift register from the right. When a logical one has been shifted into a preselected bit in the shift register, prefetching is temporarily suspended until the last instruction on a cache line is fetched by the processor, and a logical zero is shifted back into the preselected bit in the shift register. In summary, logical ones are shifted into the register from the left on prefetches and logical zeros are shifted into the register from the right when the instruction pointer crosses onto a new cache line. This mechanism will assure that, at most, "n" cache lines have been prefetched but not yet fetched by the processor. In other words, prefetches may be kept "n" cache lines in front of the instruction pointer by examining the n-th bit from the left.

FIG. 1A is a drawing of a prefetch enable shift register 100 as described in various representative embodiments of the present patent document. In representative embodiments, the prefetch enable shift register 100, also referred to herein as the shift register 100, is a bidirectional shift register 100 which could be for example an 8-bit shift register 100. The shift register 100 comprises a number of bit positions 115, only the first one on the left of which for illustrative purposes of clarity is labeled with identifying numeral in FIG. 1A. A prefetch enable detection bit 120, also referred to herein as a preselected bit 120, in the representative example is the fourth bit position 115 from the left in the shift register 100. More generally, the prefetch enable detection bit 120 would be the n-th bit position of the shift register 100. A prefetch allowed condition 125 is activated as long as a logical zero, as shown in FIG. 1A, is stored in the prefetch enable detection bit 120.

Figure 1B:
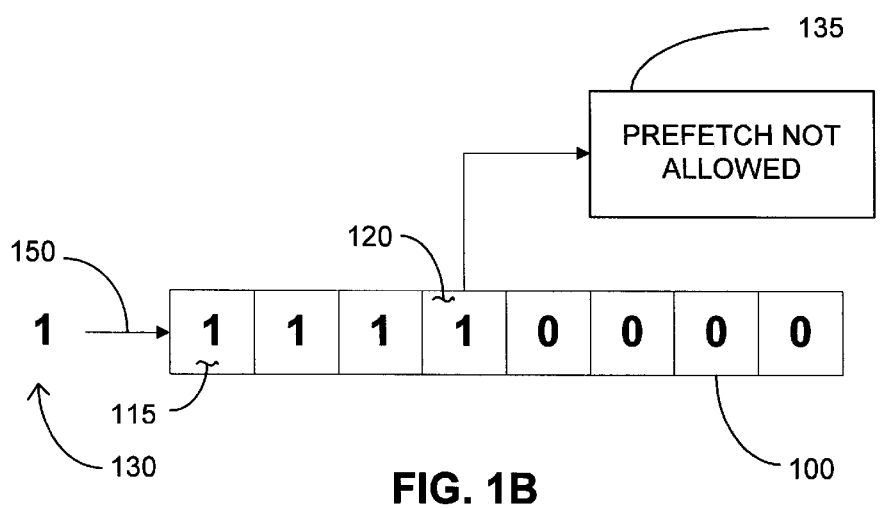
FIG. 1B is another drawing of the prefetch enable shift register as described in various representative embodiments of the present patent document.

FIG. 1B is another drawing of the prefetch enable shift register 100 as described in various representative embodiments of the present patent document. The situation indicated in FIG. 1A becomes that of FIG. 1B following the prefetch of an instruction address. In FIG. 1B, a logical one 130 has been shifted into the prefetch enable shift register 100 from a left side input 150. A logical one is now stored in the prefetch enable detection bit 120. A prefetch not allowed condition 135 is activated as long as a logical one, as shown in FIG. 1B, is stored in the prefetch enable detection bit 120. Further prefetching of instruction address is prevented until a logical zero is once again stored in the prefetch enable detection bit 120.

Figure 1C:
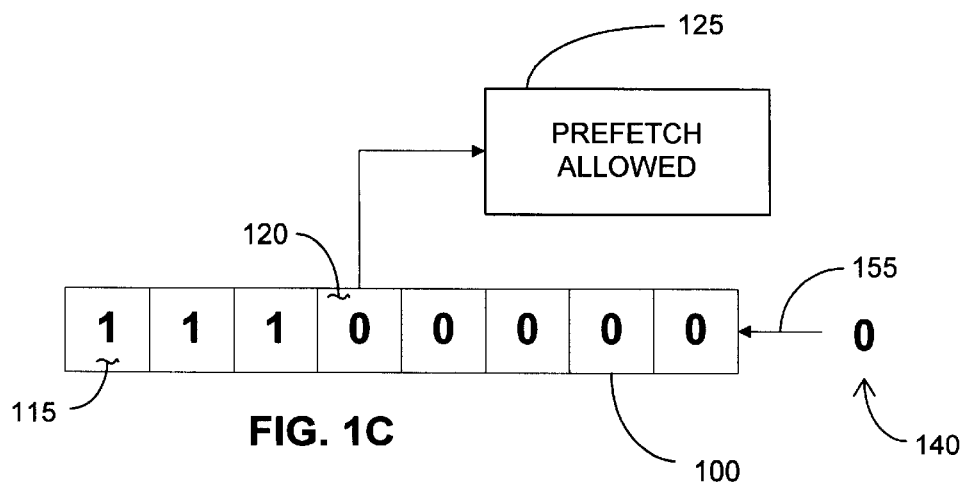
FIG. 1C is yet another drawing of the prefetch enable shift register as described in various representative embodiments of the present patent document.

FIG. 1C is yet another drawing of the prefetch enable shift register 100 as described in various representative embodiments of the present patent document. The situation indicated in FIG. 1B becomes that of FIG. 1C following the execution of the last instruction on a cache line. In FIG. 1C, a logical zero 140 has been shifted into the prefetch enable shift register 100 from a right side input 155. A logical zero is now stored in the prefetch enable detection bit 120. The prefetch allowed condition 125 is once again activated and remains so as long as a logical zero, as shown in FIG. 1C, is stored in the prefetch enable detection bit 120. Further prefetching of instruction addresses is enabled until a logical one is again stored in the prefetch enable detection bit 120. The choice of logical zero in the prefetch enable detection bit 120 to enable the prefetch allowed condition 125 is typical but arbitrary. Logical one, the complement of logical zero, could also have been chosen. For this case, logical zeros are shifted into the prefetch enable shift register 100 following the prefetch of an instruction address and logical ones are shifted into the prefetch enable shift register 100 following execution of the last instruction on a cache line. Note that in various representative embodiments left and right side inputs 150,155 can be interchanged.

Figure 2:
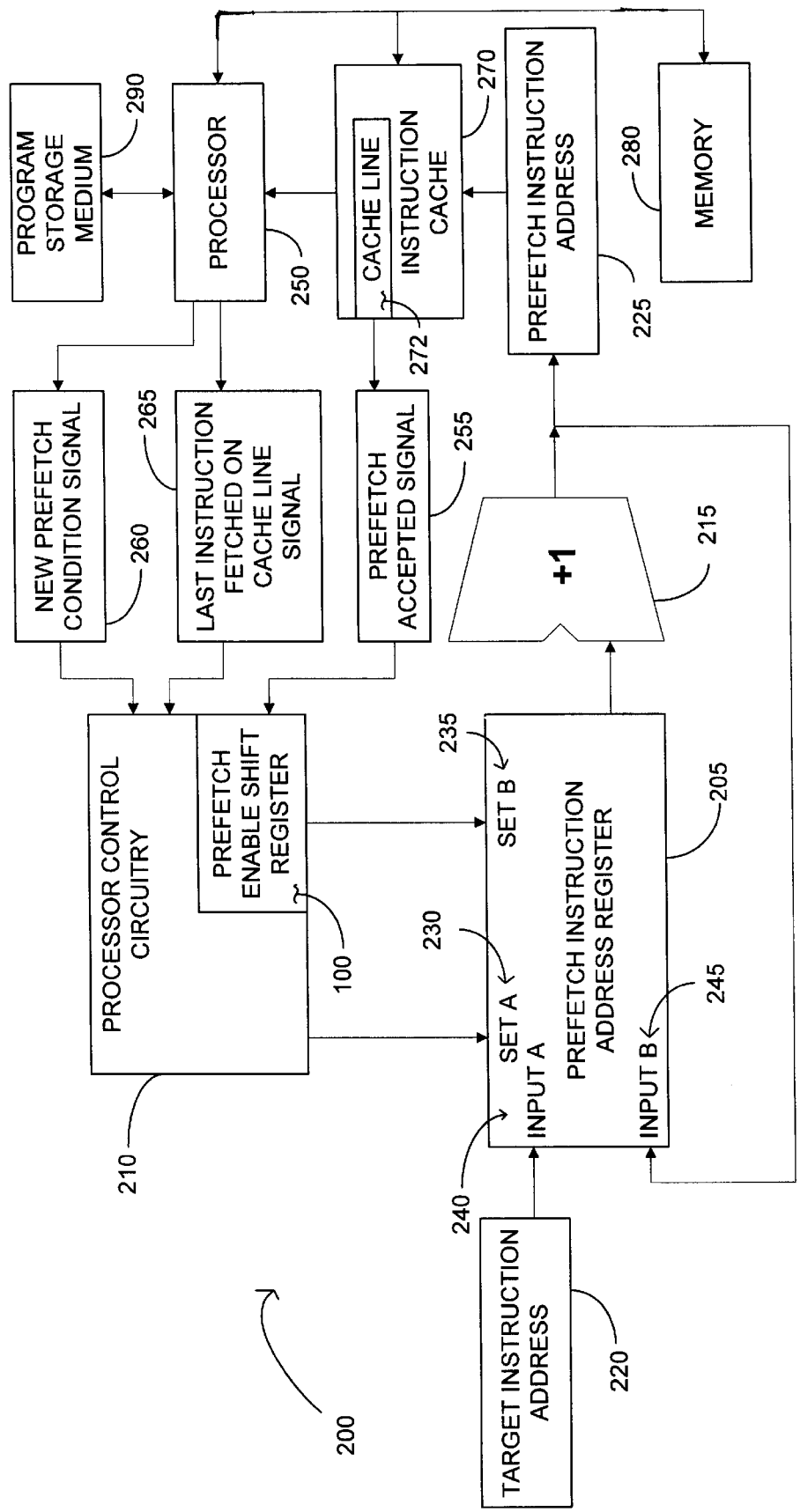
FIG. 2 is a drawing of apparatus for instruction address prefetch as described in various representative embodiments of the present patent document.

FIG. 2 is a drawing of apparatus 200 for prefetching instruction addresses as described in various representative embodiments of the present patent document. The apparatus 200 comprises a prefetch instruction address register 205, an incrementor 215, and processor control circuitry 210 comprising the prefetch enable shift register 100. Also shown in FIG. 2 are a target instruction address 220, a prefetch instruction address 225, an instruction cache 270, a processor 250, a memory 280, a program storage medium 290, a prefetch accepted signal 255, a new prefetch condition signal 260, and a last instruction fetched on cache line signal 265 that indicates that the last instruction on a cache line 272 was fetched. The processor 250 is also referred to herein as the microprocessor 250. The instruction cache 270 comprises typically more than one cache lines 272, only one of which is shown in figure two, wherein each cache line 272 comprises the addresses of at least one instruction, but typically a multiplicity of instruction addresses. While shown separately, in practice the processor 250 typically comprises several of the elements shown in FIG. 2 including, but not limited to, the memory 280, the instruction cache 270, and the processor control circuitry 210. The memory 280 comprises storage for the instructions to be executed by the processor 250 as well as other memory required by the processor 250 in performing its functions. The program storage medium 290 comprises memory storage for a software program, not shown in the Figures, for performing and controlling the prefetches. The program storage medium 290 could be, for example, hard disk, floppy disk, random access memory (RAM), read only memory (ROM) or any other computer accessible memory medium. The prefetch instruction address register 205 is also referred to herein as the address register 205.

In FIG. 2 when SET A 230 is logically TRUE, the target instruction address 220 is written into the prefetch instruction address register 205. This address is used to generate the initial memory location to begin prefetching. SET A 230 is logically TRUE when a prefetch condition is detected via the new prefetch condition signal 260. In the representative embodiment, a prefetch condition is typically coded into the software instructing the processor control circuitry 210 to begin prefetch operations. This condition is indicated in FIG. 2, wherein the new prefetch condition signal 260 is shown flowing from the processor 250 to the processor control circuitry 210. The target instruction address 220 corresponding to this condition is then ready to be written into the prefetch instruction address register 205.

If logical zero is stored in the prefetch enable detection bit 120 of the prefetch enable shift register 100 and a prefetch was issued to, or accepted by, the instruction cache 270, indicated by prefetch accepted signal 255, then SET B 235 is logically TRUE. Prefetching of instruction addresses then proceeds as follows: (1) when a new prefetch condition is detected by the processor 250, indicated via signal 260, the initial target instruction address 220 is written into the prefetch instruction address register 205 via INPUT A 240, (2) the target instruction address 220 is sent to the incrementor 215, (3) the incrementor 215 increments the instruction address to that of the next sequential address, (4) when the prefetch is accepted by the instruction cache 270, indicated via signal 255, the incremented instruction address is written into the prefetch instruction address register 205 via INPUT B 245. Prefetching of instruction addresses then continues to proceed looping through the following steps until a stop prefetch condition is encountered or until logical one 130 is written into the prefetch enable detection bit 120 of the prefetch enable shift register 100: (1) the incremented instruction address is sent to the incrementor 215, (2) the incrementor 215 increments that address to that of the next sequential address, (3) when the prefetch is accepted by the instruction cache 270, indicated via signal 255, the incremented instruction address is written into the prefetch instruction address register 205 via INPUT B 245. As required, the prefetch instruction address 225 is transferred to the instruction cache 270. After the processor 250 fetches the last instruction on cache line 272 being read by the processor 250 in the instruction cache 270, indicated via signal 265, a logical zero 140 is written into the prefetch enable shift register 100 from the right. The processor 250 will also issue a stop prefetch indicator, not shown in FIG. 2, to the processor control circuitry 210 which will halt prefetching operations. While the instruction addresses prefetched 225 in the representative embodiment have been sequential other instruction address schemes are also possible and the invention is not limited to sequential instruction addresses.

Figure 3:
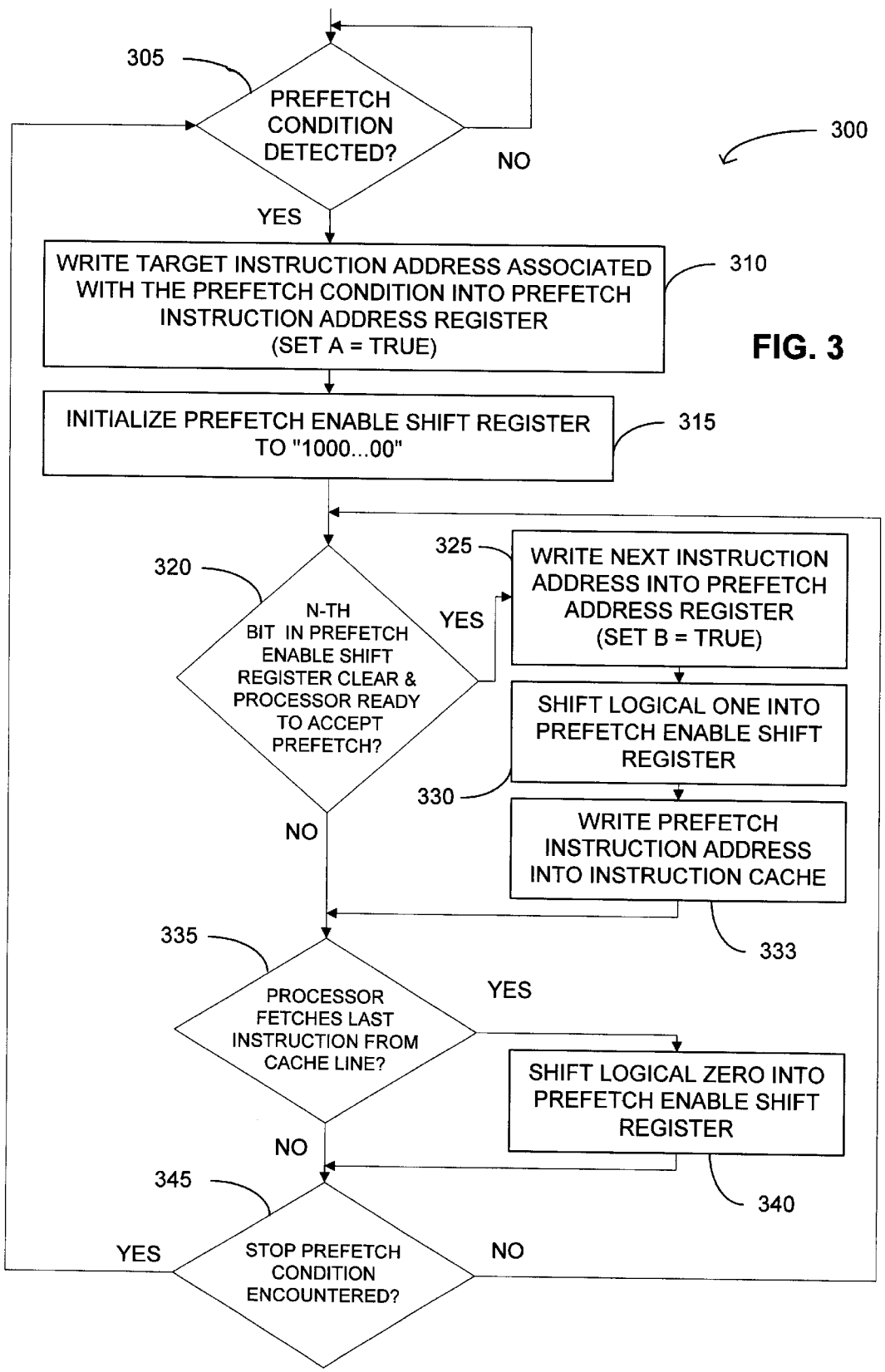
FIG. 3 is a drawing of a flowchart of a method for prefetching instruction addresses as described in various representative embodiments of the present patent document.

FIG. 3 is a drawing of a flowchart of a method for prefetching instruction addresses 300 as described in various representative embodiments of the present patent document. When a prefetch condition has been detected block 305 transfers control to block 310. A prefetch condition could be for example executing a specially encoded branch instruction that indicates prefetching is to begin at the branch target. The software generating the instructions to be executed would add the special encoding (know in the IA64 architecture as "hints") to branches when it determined that the block of instructions starting at the target address would benefit from prefetching. Otherwise block 305 loops back to itself.

Block 310 writes the target instruction address 220 associated with the prefetch condition into the prefetch instruction address register 205 by setting SET A 230 TRUE. Block 310 then transfers control to block 315.

Block 315 initializes the prefetch enable shift register 100. In the example embodiment, wherein the shift register 100 comprises eight bit positions, the bit positions 115 of the shift register 100 are set to "10000000". Block 315 then transfers control to block 320.

When the prefetch enable detection bit 120 (the n-th bit position 120) in the prefetch enable shift register 100 is equal to logical zero and the instruction cache 270 is ready to accept a prefetch, block 320 transfers control to block 325. Otherwise, block 320 transfers control to block 335.

Block 325 writes the next instruction address into the prefetch instruction address register 205. At this point SET B 235 has been set to logical TRUE. Block 325 then transfers control to block 330.

Block 330 shifts a logical one 130 from the left into the prefetch enable shift register 100. Block 330 then transfers control to block 333.

Block 333 writes the prefetch instruction address 225 into the instruction cache 270. Block 333 then transfers control to block 335.

When the processor fetches the last instruction on cache line 272 in the instruction cache 270, block 335 transfers control to block 340. Otherwise, block 335 transfers control to block 345.

Block 340 shifts a logical zero 140 from the right into the prefetch enable shift register 100. Block 340 then transfers control to block 345.

When the stop prefetch condition is encountered, block 345 transfers control to block 305. A stop prefetch condition could be for example executing a branch that redirects the processor to begin executing from a new sequence of instructions that are not being prefetched. In the representative embodiment, any branch which the software program takes will cause the stop prefetch condition. Otherwise, block 345 transfers control to block 320.

A primary advantage of the embodiments as described in the present patent document over prior microprocessor prefetching techniques is that overaggressive prefetching is eliminated. Prefetching into the instruction cache too many instructions beyond that which have been fetched by the processor can cause memory to be wasted and useful instructions in the instruction cache to be replaced by ones that may never be used. The number of prefetches in front of the current instruction pointer is tightly controlled. Embodiments of the present invention thereby conserve valuable system resources.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiment that remain within the scope of the appended claims.

What is claimed is:

1. A computer program storage medium readable by a computer, tangibly embodying a software program of instructions executable by the computer, providing the computer comprises a microprocessor, to perform method steps for prefetching instruction addresses, the method steps comprising:

when a preselected bit position in a shift register is set to a preselected logical value and the microprocessor is ready to accept the prefetch instruction address,
writing the prefetch instruction address into an address register; and
writing the prefetch instruction address into an instruction cache;
incrementing the prefetch instruction address to that of the next prefetch instruction address;
when the instruction cache has accepted the prefetch instruction address,
providing the shift register has a left side input and a right side input, providing each input has capability of shifting logical values into the shift register, shifting the complement of the preselected logical value into the shift register at the left side input; and when the microprocessor fetches last instruction from a cache line in the instruction cache, shifting a value equal to the preselected logical value into the shift register at the right side input.

2. The computer program storage medium as recited in claim 1, the method steps further comprising:

prior to the method steps of claim 1 and when a prefetch condition has been detected by processor control circuitry, writing a target instruction address associated with the prefetch condition into the address register; and initializing the shift register to complement of the preselected logical value in a bit position connected to the left side input and the preselected logical value into all other bit positions of the shift register.

3. The computer program storage medium as recited in claim 2, the method steps further comprising:

when a stop prefetch condition is encountered, terminating the prefetching of instruction addresses.

4. The computer program storage medium as recited in claim 2, providing the preselected logical value is a logical zero and the complement of the preselected logical value is a logical one.

5. The computer program storage medium as recited in claim 2, providing the preselected logical value is a logical one and the complement of the preselected logical value is a logical zero.

6. A computer operable method for prefetching instruction addresses, comprising the steps of:

when a preselected bit position in a shift register is set to a preselected logical value and a microprocessor is ready to accept the prefetch instruction address, writing the prefetch instruction address into an address register; and writing the prefetch instruction address into an instruction cache;

incrementing the prefetch instruction address to that of the next prefetch instruction address;

when the instruction cache has accepted the prefetch instruction address, providing the shift register has a left side input and a right side input, providing each input has capability of shifting logical values into the shift register, shifting the complement of the preselected logical value into the shift register at the left side input; and when the microprocessor fetches last instruction from a cache line in the instruction cache, shifting a value equal to the preselected logical value into the shift register at the right side input.

7. The computer operable method as recited in claim 6, the method steps further comprising:

prior to the method steps of claim 1 and when a prefetch condition has been detected by processor control circuitry, writing a target instruction address associated with the prefetch condition into the address register; and initializing the shift register to complement of the preselected logical value in a bit position connected to the left side input and the preselected logical value into all other bit positions of the shift register.

8. The computer operable method as recited in claim 7, the method steps further comprising:

when a stop prefetch condition is encountered, terminating the prefetching of instruction addresses.

9. The computer operable method as recited in claim 7, providing the preselected logical value is a logical zero and the complement of the preselected logical value is a logical one.

10. The computer operable method as recited in claim 7, providing the preselected logical value is a logical one and the complement of the preselected logical value is a logical zero.

11. An apparatus for prefetching instruction addresses, comprising:

an incrementor having an input and an output;

an address register having SET A and SET B control ports, inputs INPUT A and INPUT B, and an output, wherein the output of the address register is connected to the input of the incrementor and the output of the incrementor is connected to INPUT B; and a shift register, comprising a left side input, a right side input, and more than one bit positions, wherein the shift register is connected to the address register via SET B, and wherein each input has capability of shifting logical values into the shift register, wherein, when a prefetch condition has been detected by processor control circuitry, the address register has capability of accepting via INPUT A a target instruction address associated with the prefetch condition and the shift register is capable of being initialized to complement of the preselected logical value in bit position connected to the left side input and the preselected logical value into all other bit positions of the shift register, wherein when a preselected bit position in the shift register is set to the preselected logical value and a microprocessor is ready to accept the prefetch instruction address, SET B enables the incrementation by the incrementor of the address stored in the address register, wherein when an instruction cache has accepted the prefetch instruction address, the shift register has capability of shifting the complement of the preselected logical value into the shift register at the left side input, and wherein when the microprocessor fetches last instruction from a cache line in the instruction cache, the shift register has capability of shifting a value equal to the preselected logical value into the shift register at the right side input.

* * * * *